United States Patent
Lamb et al.

(10) Patent No.: US 7,469,841 B1
(45) Date of Patent: Dec. 30, 2008

(54) SELF-CONTAINED THERMAL ACTUATOR

(75) Inventors: Kevin W. Lamb, West Hartford, CT (US); Edward A. Voytek, Middlebury, CT (US); David Piscitelli, Wallingford, CT (US)

(73) Assignee: Rostra Precision Controls, Inc., Laurinburg, NC (US)

( * ) Notice: Subject to any disclaimer, the term of this patent is extended or adjusted under 35 U.S.C. 154(b) by 485 days.

(21) Appl. No.: 10/982,104

(22) Filed: Nov. 4, 2004

(51) Int. Cl.
*G05D 23/12* (2006.01)
(52) U.S. Cl. .................. 236/100; 236/99 R; 236/99 K; 236/93 A; 236/93 R
(58) Field of Classification Search ............... 236/99 R, 236/99 K, 100, 93 A, 93 R
See application file for complete search history.

(56) References Cited

U.S. PATENT DOCUMENTS

| | | | | |
|---|---|---|---|---|
| 3,427,883 A | * | 2/1969 | Kuze | 60/527 |
| 3,777,495 A | * | 12/1973 | Kuze | 60/530 |
| 4,036,433 A | * | 7/1977 | Wagner et al. | 236/100 |
| 4,278,407 A | * | 7/1981 | Yasuhara et al. | 417/292 |
| 4,346,837 A | * | 8/1982 | Inagaki et al. | 236/34.5 |
| 4,600,317 A | * | 7/1986 | Mori | 384/117 |
| 5,033,865 A | * | 7/1991 | Kuze | 374/160 |
| 5,119,061 A | * | 6/1992 | Kuze | 337/393 |
| 5,302,993 A | * | 4/1994 | Farling et al. | 396/576 |
| 6,988,364 B1 | * | 1/2006 | Lamb et al. | 60/508 |

* cited by examiner

*Primary Examiner*—Frantz F. Jules
*Assistant Examiner*—Azim Rahim
(74) *Attorney, Agent, or Firm*—Alix, Yale & Ristas, LLP

(57) ABSTRACT

A self-contained thermal actuator positions the piston return member inside the actuator cup. The inventive configuration eliminates the guide and diaphragm seal that closed the open end of the wax filled cup in the typical thermal actuator configuration. The piston and an O-ring seal seated in an annular recess defined by the piston contain the thermally responsive wax. A return member within the cup and engaged between axially spaced, radially overlapping shoulders on the cup and piston biases the piston toward its pre-actuation position. The return member may be a spring or an elastomeric O-ring that also seals the thermal actuator against intrusion of contaminants from the use environment. The piston is closely received in the cup for guided axial reciprocation therein.

20 Claims, 4 Drawing Sheets

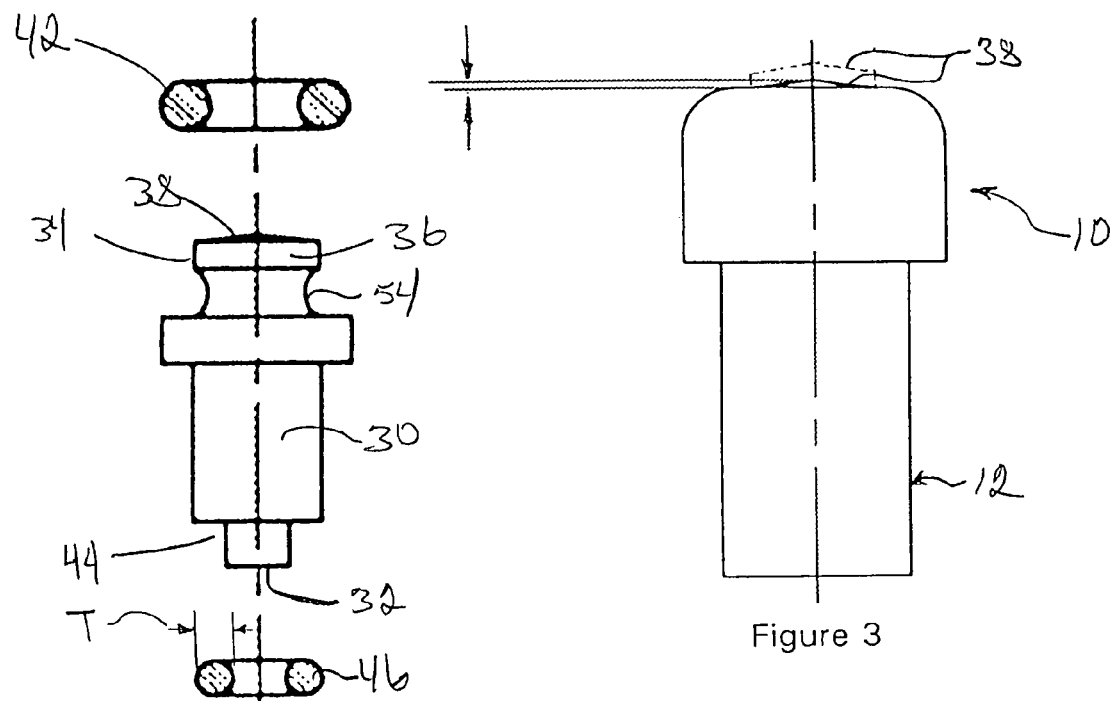
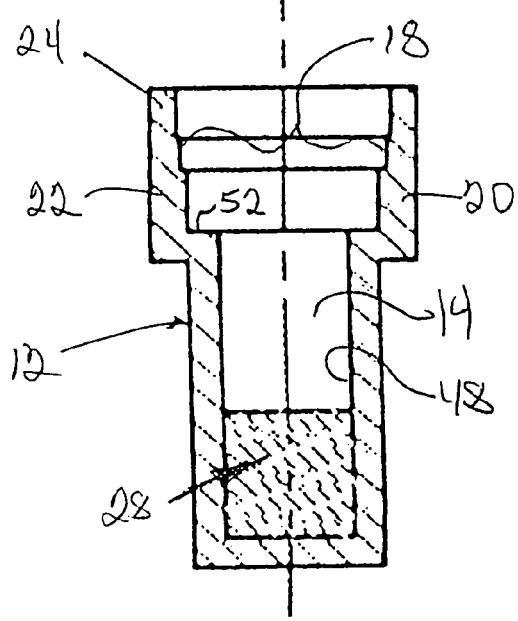
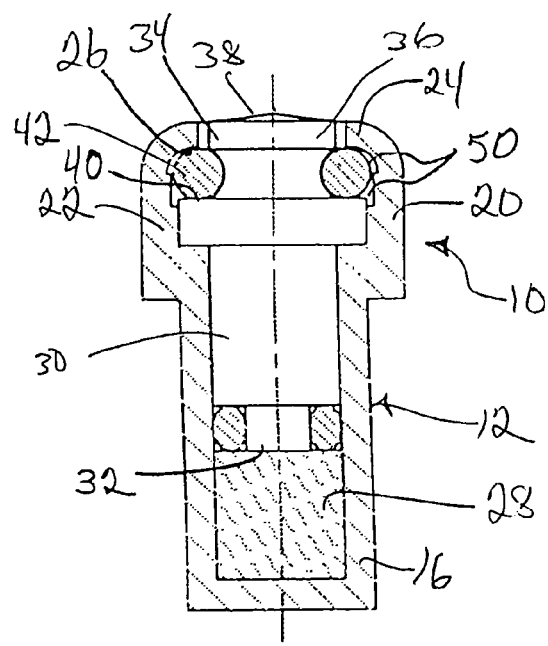
Figure 3
Figure 2
Figure 1

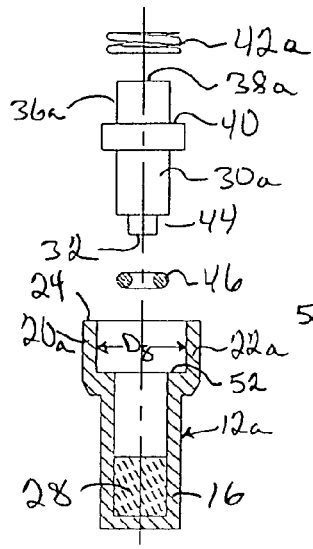
Figure 8
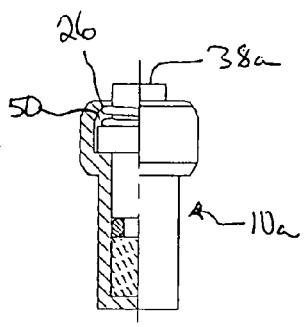
Figure 9
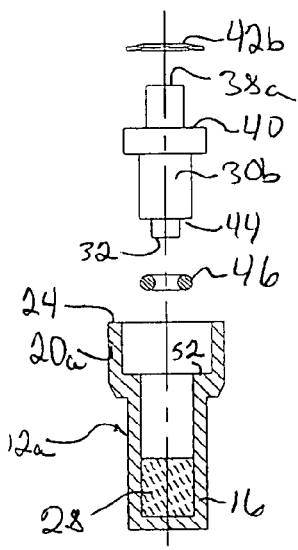
Figure 10
Figure 11
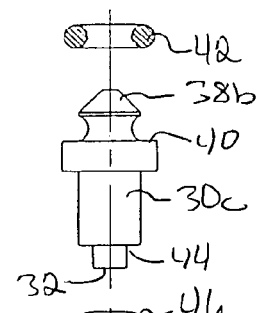
Figure 12
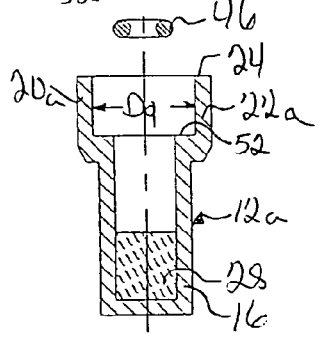
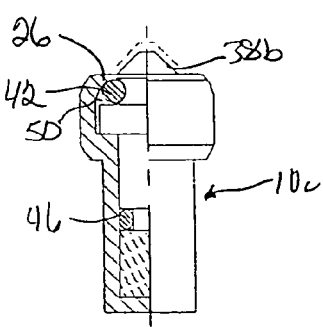
Figure 13

SELF-CONTAINED THERMAL ACTUATOR

BACKGROUND OF THE INVENTION

1. Field of the Invention

The present invention relates to a thermally actuated control device, particularly of the type wherein a thermally responsive wax generates a force to move an actuator in the form of a push rod or the like.

2. Description of the Related Art

Actuators of this type are often used for thermal control valves, such as described in U.S. Pat. Nos. 2,873,633, 4,036,433 and 5,176,317. Typically, such actuators are designed to produce a predetermined actuating movement in response to a change in temperature. One typical configuration for a thermal actuator includes a rigid cup filled with the thermally responsive wax, a resilient diaphragm wax seal covering the wax, a rigid guide member covering the diaphragm wax seal, and an actuator rod or piston received in the guide member to bear on a plug extending from the wax seal. An increase in temperature $\Delta T$ causes the thermally responsive wax to expand, generating a force against the diaphragm wax seal, plug and piston to do some work. An actuator of this type can be used to open or close a valve, for example. The typical thermal actuator installation also includes a return spring arranged to bias the piston, plug and diaphragm toward their pre-actuation (return) position. The return spring ensures that upon a decrease in temperature the shifted valve or element returns to its pre-actuation position. The necessity for an external biasing member complicates assemblies utilizing the wax filled thermal actuator and precludes provision of a self-contained actuator of this type. The present inventors have recognized a need to provide a thermal actuator of the thermally responsive wax type which does not require an external biasing element. Such a thermal actuator simplifies assemblies using the device and expands possible applications for the actuator.

SUMMARY OF THE INVENTION

The present invention relocates the return member for a thermal actuator inside the rigid cup and eliminates the guide and diaphragm seal typical of the prior art. The piston of the inventive thermal actuator is configured to fill the top portion of the cup. A seal between the piston and the cup contains the thermally responsive wax in the bottom of the cup. The inside surface of the cup and the outside surface of the piston cooperate to guide the reciprocal axial movement of the piston between pre-actuation and actuated positions.

The inventive thermal actuator eliminates the separately manufactured guide member of the typical actuator design. Further, a simple O-ring seal replaces the more complex diaphragm seal and its associated plug. One benefit of the inventive design is a more direct force delivery from the expanding wax to the piston due to elimination of the intervening diaphragm seal and plug of the prior art. O-ring seals are standard elements whose mechanical behavior and sealing characteristics are well understood. Therefore, an effective wax containment seal can be accomplished at reduced cost compared to the previous diaphragm type seal.

The return member may be a second O-ring-shaped elastomeric member engaged between an annular shoulder on the cup and an annular shoulder on the piston to return the piston to its pre-actuation position when the thermally responsive wax cools. This configuration is particularly suited to a use environment for the thermal actuator that requires relatively short plunger travel. Alternatively, the return member may be a conventional coil spring or a stack of Belleville-type washer springs. Other configurations and materials for an internal return member may be compatible with the present invention.

The invention is particularly useful in applications requiring a miniature, self-contained thermal actuator. The disclosed thermal actuator configuration provides a simple, durable, reliable and relatively inexpensive thermally responsive actuator.

BRIEF DESCRIPTION OF THE DRAWINGS

FIG. 1 is a longitudinal sectional view through a first embodiment of a thermal actuator according to aspects of the present invention;

FIG. 2 is an exploded preassembly sectional view of the thermal actuator of FIG. 1;

FIG. 3 is an exterior side view of the thermal actuator of FIGS. 1 and 2;

FIG. 8 is an exploded preassembly sectional view of a first alternative embodiment of a thermal actuator according to aspects of the present invention;

FIG. 9 is a partial sectional view of the thermal actuator of FIG. 8 as assembled;

FIG. 10 is an exploded preassembly sectional view of a second alternative embodiment of a thermal actuator according to aspects of the present invention;

FIG. 11 is a partial sectional view of the thermal actuator of FIG. 10 as assembled;

FIG. 12 is an exploded preassembly sectional view of a third alternative embodiment of a thermal actuator according to aspects of the present invention; and FIG. 13 is a partial sectional view of the thermal actuator of FIG. 12 as assembled.

DETAILED DESCRIPTION OF THE PREFERRED EMBODIMENTS

Figure 5:
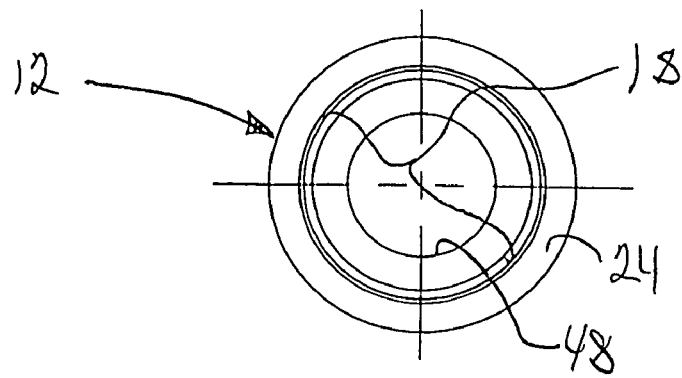
FIG. 5 is a top end view of the cup of FIG. 4.
Figure 4:
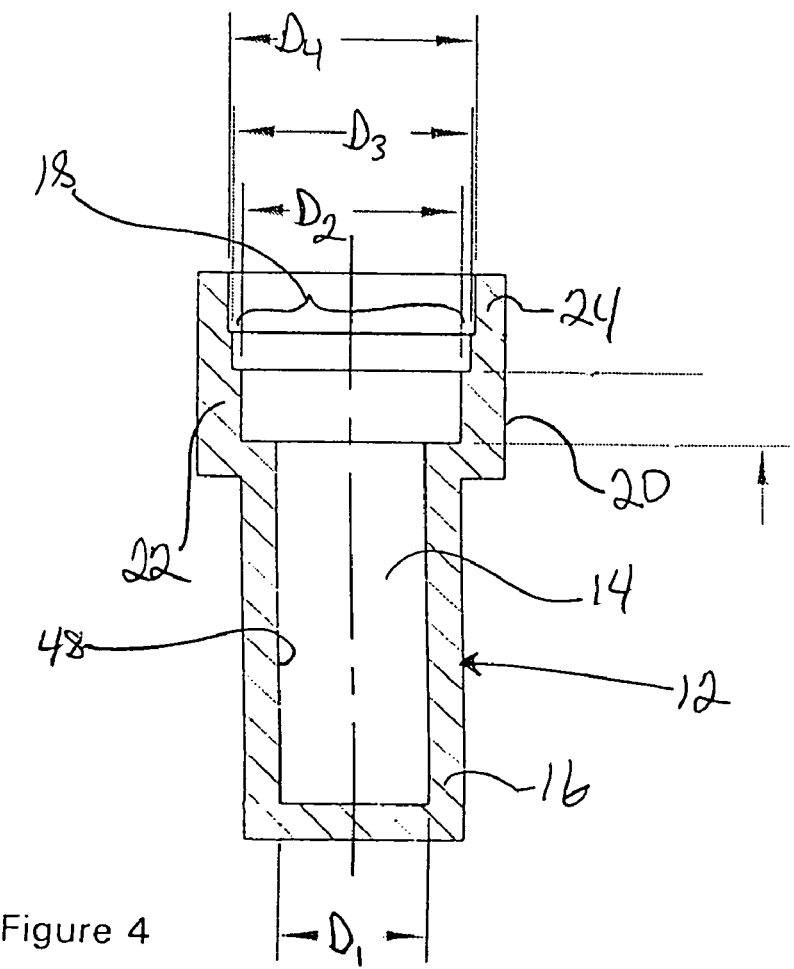
FIG. 4 is a longitudinal sectional view of a cup suitable for use in the thermal actuator of FIGS. 1-3.
Figure 6:
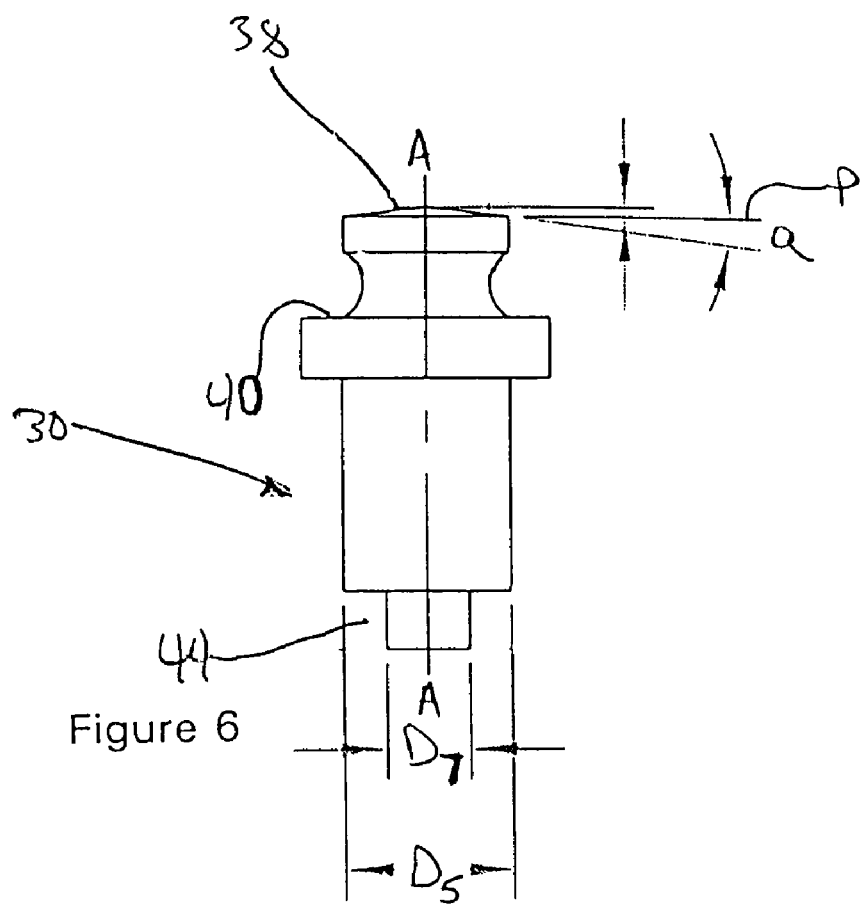
FIG. 6 is an exterior side view of a piston compatible with the thermal actuator of FIGS. 1-3.
Figure 7:
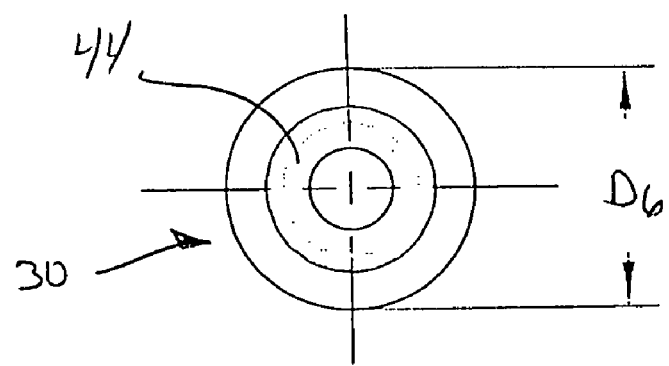
FIG. 7 is a bottom end view of the piston of FIG. 6.

A first embodiment of a thermal actuator according to aspects of the present invention will now be described with reference to FIGS. 1-7. The thermal actuator 10 includes a rigid cup 12 defining a longitudinal bore 14 extending from a closed bottom portion 16 of the cup to an opening 18 defined by a top portion 20 of the cup. A wall 22 surrounds the opening 18 at the top of the cup. As best seen in FIGS. 2 and 4, the bore 14 in the cup may be a stepped bore having a first diameter $D_1$ at the bottom portion 16 of the cup and expanding in stepwise fashion $D_2$, $D_3$, $D_4$ as the bore progresses toward the open top portion 20 of the cup. The largest diameter $D_4$ of the bore 14 thins the cup wall 22 to form a lip 24. After the parts shown in FIG. 2 are assembled together and installed within the cup as shown in FIG. 1, the lip 24 is bent (formed) inwardly to define a first annular shoulder 26. The inwardly formed lip 24 retains the parts within the cup 12 as a substantially sealed, self-contained unit.

The bottom portion 16 of the cup is filled with a predetermined quantity of thermally responsive wax 28. The thermally responsive wax 28 is selected to provide a desired actuation force F by expansion in response to a known increase in temperature $\Delta T$. As is known in the art, thermally responsive wax can be formulated to expand to generate the actuation force F over a broad range of temperatures.

A piston 30 (which also may be referred to as a plunger herein) is arranged in the longitudinal bore 14 of the cup 12 for axial reciprocation between pre-actuation and actuated positions. The piston 30 extends from a first end 32 adjacent the thermally responsive wax 28 to a second end 34 having a head 36. The piston head 36 includes an actuation surface 38. The actuation surface 38 of the illustrated piston 30 is a conical surface centered on a longitudinal axis A of the piston 30. The conical actuation surface has a shallow angle α of approximately 7° relative to a perpendicular P to the longitudinal axis A. Piston diameters $D_5$ and $D_6$ cooperate with longitudinal bore diameters $D_1$ and $D_2$ to guide the piston 30 during axial movement.

The piston 30 includes a radially outwardly projecting second annular shoulder 40 having a diameter $D_6$. The second annular shoulder 40 is configured to radially overlap the first annular shoulder 26 (provided by the inwardly formed lip 24) in axially spaced relationship. A return member 42 in the form of an elastomeric O-ring is engaged between the first and second annular shoulders 26, 40 to bias the piston 30 toward the thermally responsive wax 28. As best shown in FIGS. 1 and 2, diameters $D_2$ and $D_3$ of the longitudinal bore 14 are configured to accommodate axial movement of the piston shoulder 40 and compression of the return member 42. The return member 42 is compressed when the piston 30 is in its actuated position and expands to return the piston to its pre-actuation position when the thermally responsive wax cools. The predetermined quantity of thermally responsive wax 28 is selected so its volume does not interfere with seating of the piston 30 in its pre-actuation position (at the cold temperature). In other words, the wax is measured by volume and is left lower than the bottom of the piston 30. Therefore, the return member 42 will return the piston 30 all the way to a hard stop on shoulder 52 after each cooling of the thermal actuator. Thus, the pre-actuation position of the actuation surface 38 relative to the cup 12 will be the same after each actuation cycle.

The first end 32 of the piston defines an annular recess 44 in which is seated an O-ring seal 46. The O-ring seal 46 is selected with a thickness T that will be radially compressed between $D_7$ of the piston 30 and the inside surface 48 of the longitudinal bore to contain the thermally responsive wax 28 below the piston 30. Force F generated by the expanding wax is delivered to the first end piston and seal 46 to move the piston toward the open end portion 20 of the cup, e.g., toward an actuated position. This piston movement compresses the return member 42 and moves the actuation surface 38 of the head of the piston above the formed lip 24 of the cup to an actuated position (shown in dashed lines on FIG. 3). In the piston return position shown in FIGS. 1 and 3, the center of the actuation surface 38 projects above the inwardly formed lip 24. The particular shape of the piston head 36 and its actuation surface 38 may be modified to suit a particular use environment. Movement of the actuation surface 38 of the head from the position shown in FIG. 1 to the actuated position shown in dashed lines in FIG. 3 can be used to perform work such as actuating a switch, closing or opening a valve, or the like.

The configuration of the return member 42 and/or the properties of its material can be altered to control movement of the piston 30. For example, changing the durometer of the return member material will have an effect similar to placement of a weaker or stronger spring in the assembly. Material durometer also affects the speed of movement of the piston 30. Another variable in piston movement for the thermal actuator 10 is the configuration of the piston groove 54 in which the return member 42 is seated, as well as the space 50 surrounding the return member 42. The space 50 around the return member 42 accommodates its elastic deformation during piston actuation. In thermal actuator 10, this space is provided by the diameters $D_3$ and $D_4$ of the top portion 20 of the cup as shown in FIG. 1. Alternatively, the return member 42 may be selected so that it is loosely seated in piston groove 54 or the piston groove 54 configuration may be altered to provide the necessary expansion space. The configuration of the piston groove 54 may also be altered to provide space to accommodate return member deformation.

As best shown in FIG. 3, the assembled thermal actuator is a self-contained unit 10. The return member 42 is arranged inside the cup 12 and secondarily functions to seal the inside of the actuator 10 against the intrusion of foreign matter. The self-contained and substantially sealed configuration of the thermal actuator 10 simplifies incorporating the actuator into an assembly and dramatically expands the number of uses for such actuators.

FIGS. 8-13 illustrate three alternative embodiments of a thermal actuator according to aspects of the present invention. Each of the three alternative embodiments 10a, 10b, 10c function in a manner substantially similar to the thermal actuator 10 described above. The alternative embodiments will be described in detail only where they differ from thermal actuator 10.

FIGS. 8 and 9 illustrate a first alternative embodiment of thermal actuator 10a. The cup 12a shown in FIG. 8 is of a simplified configuration at its top portion 20a. The wall 22a surrounding the top portion 20a is of a constant thickness, eliminating the stepped bore of the top portion 20 shown in FIG. 2. The diameter D8 of the top portion 20a of the cup 12a is selected to correspond roughly to diameter D3 of cup 12 shown in FIG. 4. Diameter D8 leaves some extra space 50 in the top portion 20a of the cup 12a after inward deformation of the lip 24 to define the first annular shoulder 26. This space 50 accommodates elastic deformation of an elastomeric return member such as that illustrated in FIGS. 1 and 13. Elimination of the stepped bore shown in FIG. 4 simplifies manufacture of the thermal actuator. Thermal actuator 10a employs a return member 42a in the form of a coil spring. Piston 30a is configured with a second annular shoulder 40 and head 36a complimentary to the coil spring return member 42a. The components illustrated in FIG. 8 are assembled as shown in FIG. 9 and lip 24 is inwardly formed to define a first annular shoulder 26 in axially spaced relation to the second annular shoulder 40. The coil spring return member 42a is compressed between the first and second annular shoulders. The actuation surface 38a of piston 30a is a simple flat surface exemplary of the many alternative actuation surface configurations compatible with the present invention.

FIGS. 10 and 11 illustrate a second alternative embodiment of a thermal actuator 10b employing the same simplified cup 12a as described with respect to FIGS. 8 and 9. The return member 42b of thermal actuator 10b is in the form of a stack of belleville-type washer springs engaged between first and second annular shoulders 26, 40. Thermal actuator 10b employs a simple flat actuation surface 38a.

FIGS. 12 and 13 illustrate a third alternative embodiment of a thermal actuator 10c. Thermal actuator 10c employs the simplified cup 12a as discussed with respect to FIGS. 8 and 9. The diameter D9 of the top portion 20a of the cup 12a is selected to include an annular space 50 which accommodates elastic deformation of the elastomeric return member 42 during piston movement between return and actuated positions. The piston 30c illustrates a still further alternative configuration for an actuation surface 38b. Actuation surface 38b includes a steeply angled conical surface with a flat tip.

FIGS. 9, 11 and 13 illustrate the pistons 30a, 30b, 30c in their return or pre-actuation positions. The pre-actuation positions are defined by a hard stop between the underside of the second annular shoulder 40 and a shoulder 52 between the upper and lower cup portions 20, 16. This hard stop-defined pre-actuation position ensures that the piston 30a, 30b, 30c will be in the same position relative to the cup 12a at sub-actuation temperatures.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A thermal actuator comprising:
    a rigid cup having a first shoulder, a longitudinal axis, a closed bottom portion defining a cavity and an open top portion;
    a quantity of thermally responsive wax in said cavity;
    a plunger disposed in said cup and extending from said thermally responsive wax to at least said open top portion for axial reciprocation therein, said plunger including a second shoulder;
    a seal arranged to contain said thermally responsive wax in said cavity; and
    a return member within said cup and engaged between said first shoulder and said second shoulder to bias said plunger toward said thermally responsive wax at all positions of said plunger.

2. The thermal actuator of claim 1, wherein said first shoulder comprises a radially inwardly projecting lip extending from a wall of the cup surrounding said top portion.

3. The thermal actuator of claim 1, wherein said first shoulder comprises a radially inwardly projecting lip extending from a wall surrounding said top portion and said second shoulder comprises a radial projection from said plunger, said lip and said projection radially overlapping in spaced axial relationship.

4. The thermal actuator of claim 1, wherein said return member comprises a first ring of elastic polymer.

5. The thermal actuator of claim 4, wherein said seal comprises a second ring of elastic polymer compressed between an inside surface of said cup and said plunger.

6. The thermal actuator of claim 4, wherein said plunger includes an annular recess adjacent said thermally responsive wax and said seal comprises a second ring of elastic polymer seated in said annular recess and radially compressed between an inside surface of said cup and said plunger.

7. The thermal actuator of claim 1, wherein said cup is configured to permit axial movement of said second shoulder relative to said first shoulder.

8. The thermal actuator of claim 1, wherein said return member is an elastic O-ring.

9. The thermal actuator of claim 1, wherein said thermally responsive wax expands in response to an increase in temperature $\Delta T$ to generate a force F on said plunger and seal to compress said return member and move said plunger axially away from the closed end of the cup.

10. The thermal actuator of claim 1, wherein said first shoulder comprises a radially inwardly projecting lip extending from a wall surrounding said top portion, said lip defining an axial terminus of said cup, said plunger having an actuation surface positioned at or above said axial terminus.

11. The thermal actuator of claim 1, wherein said plunger has a head axially spaced from said thermally responsive wax, said head axially terminating in an actuation surface.

12. The thermal actuator of claim 1, wherein said plunger has an axis, a head axially spaced from said thermally responsive wax, said head axially terminating in a conical actuation surface centered on said axis, said plunger maximum length measured along said axis.

13. The thermal actuator of claim 1, wherein said plunger axially reciprocates between a pre-actuation position and an actuated position in which said return member is compressed, said return member expanding to return said plunger to its pre-actuation position.

14. A thermal actuator comprising:
    a cup defining a bore extending from a closed bottom portion filled to an intermediate level with thermally responsive wax to a top portion comprising a wall from which extends a radially inward projecting lip defining a first annular shoulder and an axial opening;
    a piston arranged in said bore and including a first end defining an annular recess adjacent said thermally responsive wax, a second end including a head adjacent said axial opening and a radially projecting second annular shoulder intermediate said head and said first end, said second annular shoulder radially overlapping said first annular shoulder in spaced axial relationship;
    a seal seated in said annular recess and radially compressed between said cup and said piston to contain said thermally responsive wax in said bottom portion; and
    an annular elastomeric polymer member engaged between said first and second annular shoulders to bias said piston toward said thermally responsive wax and a pre-actuation position,
    wherein said thermally responsive wax expands in response to an increase in temperature $\Delta T$ to generate a force F on said piston and seal to compress said annular elastomeric polymer member between said first and second annular shoulders to move said piston axially away from the closed bottom portion of the cup to an actuated position.

15. The thermal actuator of claim 14, wherein upon cooling of said thermally responsive wax, said return member expands to return said piston to its pre-actuation position.

16. The thermal actuator of claim 14, wherein said seal comprises a second annular elastomeric polymer member.

17. The thermal actuator of claim 14, wherein said annular elastomeric polymer member and said seal are O-rings.

18. The thermal actuator of claim 14, wherein said piston has an axis and said head axially terminates in a conical actuation surface centered on said axis.

19. The thermal actuator of claim 14, wherein said bore is a stepped bore which increases in diameter from a first diameter at said closed bottom portion to a greater second diameter radially adjacent said second annular shoulder, said stepped bore configured to accommodate axial reciprocation of said second annular shoulder in said cup.

20. The thermal actuator of claim 15, wherein said pre-actuation position is defined by a hard stop between said piston and said cup.

* * * * *